US012748380B2

(12) United States Patent
Testori

(10) Patent No.: US 12,748,380 B2
(45) Date of Patent: Sep. 29, 2026

(54) COMPENSATION OF RATE VARIATION IN A WATCH

(71) Applicant: OMEGA SA, Biel/Bienne (CH)

(72) Inventor: Léonard Testori, Bienne (CH)

(73) Assignee: OMEGA SA, Biel/Bienne (CH)

( * ) Notice: Subject to any disclaimer, the term of this patent is extended or adjusted under 35 U.S.C. 154(b) by 749 days.

(21) Appl. No.: 18/080,100

(22) Filed: Dec. 13, 2022

(65) Prior Publication Data

US 2023/0195040 A1 Jun. 22, 2023

(30) Foreign Application Priority Data

Dec. 21, 2021 (EP) .................................... 21216225

(51) Int. Cl.
*G04B 37/02* (2006.01)
*G04B 17/10* (2006.01)
*G04B 37/08* (2006.01)
*G04B 99/00* (2006.01)

(52) U.S. Cl.
CPC ............. *G04B 37/02* (2013.01); *G04B 17/10* (2013.01); *G04B 37/088* (2013.01); *G04B 99/00* (2013.01)

(58) Field of Classification Search
CPC ........ G04B 37/02; G04B 17/20; G04B 17/22; G04B 17/10; G04B 37/088; G04B 99/00; G04D 7/007
See application file for complete search history.

(56) References Cited

U.S. PATENT DOCUMENTS 2,463,315 A * 3/1949 Rosen .................... G04B 37/02 D10/38
6,312,153 B1 * 11/2001 Okada .................... G04G 3/022 368/47
2005/0270908 A1 * 12/2005 Gueissaz ................ G04D 7/007 368/11
2005/0281137 A1 * 12/2005 Bourgeois ................. F16F 1/10 368/175
(Continued)

FOREIGN PATENT DOCUMENTS

CH 312740 A 2/1956
CH 710 308 A2 4/2016
(Continued)

OTHER PUBLICATIONS

European Search Report of No. 21216225 dated Jun. 16, 2022.

*Primary Examiner* — Edwin A. Leon
(74) *Attorney, Agent, or Firm* — Sughrue Mion, PLLC

(57) ABSTRACT

A method for compensating the rate as a function of the temperature of a watch (1). A water-resistant case (2) contains a movement (3) with an oscillator (4), in an internal volume V occupied by n moles of a gas of constant R, where the pressure coefficient Cp and the humidity coefficient Ch of the movement (3) are determined, an optimal value Cto of the thermal coefficient Ct of the oscillator (4) is calculated defining the relatively linear variation of the rate thereof as a function of the temperature T, compensating the pressure and humidity deviations. The pressure P and/or the constant R and/or the quantity of gas and/or the temperature T are varied in the case. In the factory, the thermal coefficient of elastic return, and/or the quantity and/or the nature of the gas in the watch, and/or the internal volume of the case (2) are modified.

18 Claims, 1 Drawing Sheet

(56) References Cited

U.S. PATENT DOCUMENTS

| | | | | |
|---|---|---|---|---|
| 2010/0320661 | A1* | 12/2010 | Charbon | G04B 17/227<br>29/896.9 |
| 2016/0238994 | A1* | 8/2016 | Ching | C30B 29/06 |
| 2019/0324402 | A1* | 10/2019 | Rotaru | G04D 7/007 |
| 2020/0319597 | A1* | 10/2020 | Musy | G04B 31/04 |

FOREIGN PATENT DOCUMENTS

| | | | |
|---|---|---|---|
| CN | 110389521 | A | 10/2019 |
| EP | 1 039 352 | A1 | 9/2000 |
| EP | 1388766 | A1 | 2/2004 |
| EP | 1422436 | A1 | 5/2004 |
| EP | 2264553 | A2 | 12/2010 |
| EP | 2264553 | A3 | 3/2011 |
| EP | 2 770 380 | A1 | 8/2014 |
| EP | 3333649 | A1 | 6/2018 |
| EP | 3561612 | A1 | 10/2019 |
| JP | 2019-215323 | A | 12/2019 |
| WO | 2013/084040 | A1 | 6/2013 |
| WO | 2015/113973 | A1 | 8/2015 |

* cited by examiner

COMPENSATION OF RATE VARIATION IN A WATCH

CROSS REFERENCE TO RELATED APPLICATIONS

This application is claiming priority based on European Patent Application No. 21216225.9 filed on Dec. 21, 2021.

TECHNICAL FIELD OF THE INVENTION

The invention relates to a method for compensating the rate as a function of the temperature of a water-resistant watch, wherein the water-resistant case contains a movement itself including an oscillator, said case containing, on leaving the factory after the initial rate setting, an internal volume V occupied by n moles of a gas of constant R substantially observing the ideal gas law.

The invention further relates to a watch suitable for the implementation of this method, particularly during after-sales operations.

The invention relates to the field of the rate adjustment of mechanical or electromechanical watches.

TECHNOLOGICAL BACKGROUND

The rate of a watch is subject to numerous parameters, such as, non-restrictively the spatial position of the watch, lubrication, wear, winding of the springs forming the sources of energy, friction, and obviously the physical parameters of the environment wherein the watch is placed.

Rate variation according to the temperature is a constant concern of watch manufacturers. The elastic return means of the oscillator are particularly sensitive to temperature variations. In the specific and non-restrictive case where these elastic return means include a balance-spring or several balance-springs, the thermal coefficient Ct of each balance-spring causes the rate of the movement to vary as a function of the temperature. It can be considered, by way of example and to simplify the calculations, that the rate varies substantially linearly as a function of the thermal coefficient Ct.

To obtain a better movement precision, the thermal coefficient is targeted at 0 seconds per day per Kelvin. With such parameters, the temperature variations should not influence the rate of the movement. The typical distribution of the thermal coefficient for a product of identical movements is a symmetrical curve, closer to a triangular peak than to a bell.

It is known in watchmaking that the rate of a movement varies as a function of the pressure of the medium wherein it is located. Several explanations can be put forward such as for example the variation of the inertia of the oscillator (inertia of the balance and the loaded air) as the loaded air density varies and therefore also the inertia thereof. The case of the balance and that of the air are specific cases, more generally reference will be made to inertial mass, and gas or gas mixture. The various experiments conducted show that if the pressure drops, the rate increases.

Therefore, it is necessary to compensate the rate of the watch as a function of the variation of the physical parameters: temperature of the medium, user's body temperature, expansion or contraction of the watch case as a function of the temperature, pressure of the location, altitude, hygrometry. However, there is no simple development for particularly handling the problems inherent to temperature and pressure variations.

SUMMARY OF THE INVENTION

The invention relates to the compensation of the rate variation of a watch, based on the temperature and the pressure.

For this purpose, the invention relates to a method for compensating the rate as a function of the temperature of a water-resistant watch, according to claim 1.

The invention further relates to a watch suitable for the implementation of this method, particularly during after-sales operations.

BRIEF DESCRIPTION OF THE FIGURES

The aims, advantages and features of the invention will become more apparent upon reading the following detailed description, with reference to the appended drawings, wherein.

DETAILED DESCRIPTION OF THE INVENTION

The invention relates to the compensation of the rate variation of a watch, based on the temperature and the pressure.

Figure 1:
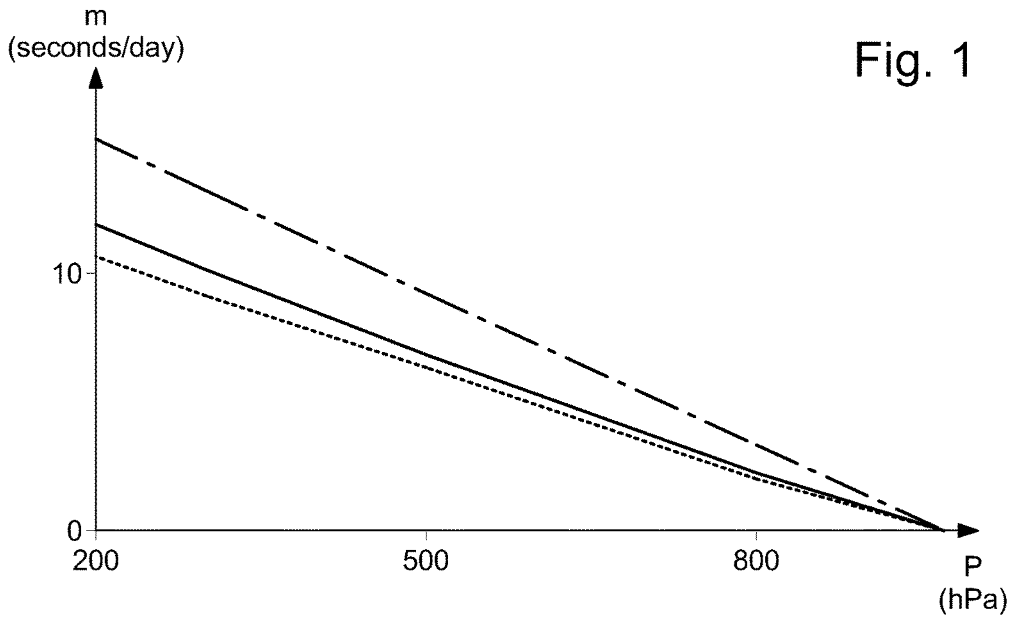
FIG. 1 superimpose three graphs illustrating on the y-axis the rate, in seconds per day, as a function of the pressure on the x-axis, in hectopascal, for three different watch movements.

The experiment conducted in a vessel in under-pressure shows a relatively good linearity of the rate variations for a pressure varying from atmospheric pressure (970 hPa) up to a pressure of 200 hPa, the rate variation in seconds per day on the y-axis, as a function of the pressure in hectopascal on the x-axis, the measurement being made in a vessel in under-pressure. FIG. 1 shows the results of measurements made on various tried-and-tested conventional mechanical movements. The very linear general course of the daily rate as a function of the pressure is observed, all other things being equal, with respective slopes of (−0.0206) for the top curve, (−0.0161) for the median curve, (−0.0145) for the bottom curve.

An experiment on watches equipped with another gauge than those in FIG. 1 shows a rate variation of the order of 1.95 seconds per day, for a difference in altitude of approximately 570 m. Based on the following altitude formula:

$p(h)=1013.25*(1-(0.0065*h/288.15)^{5.255}$, it can be found that the rate variation as a function of the altitude for this gauge is of the order of 0.03 seconds per day per hPa. This value will be referred to as the pressure coefficient: Cp.

In respect to the pressure variation as a function of the temperature, we will make the assumption that the ideal gas law (P*V=n*R*T) is sufficient to define the situation.

In a closed watch, the volume of air available is considered to be given and finite (assuming that the leaks are zero). We will also make the assumption that the pressure differential between the pressure inside the watch and outside the watch is not sufficient to distort the watch; the volume available in the watch does not vary and therefore remains constant.

Figure 2:
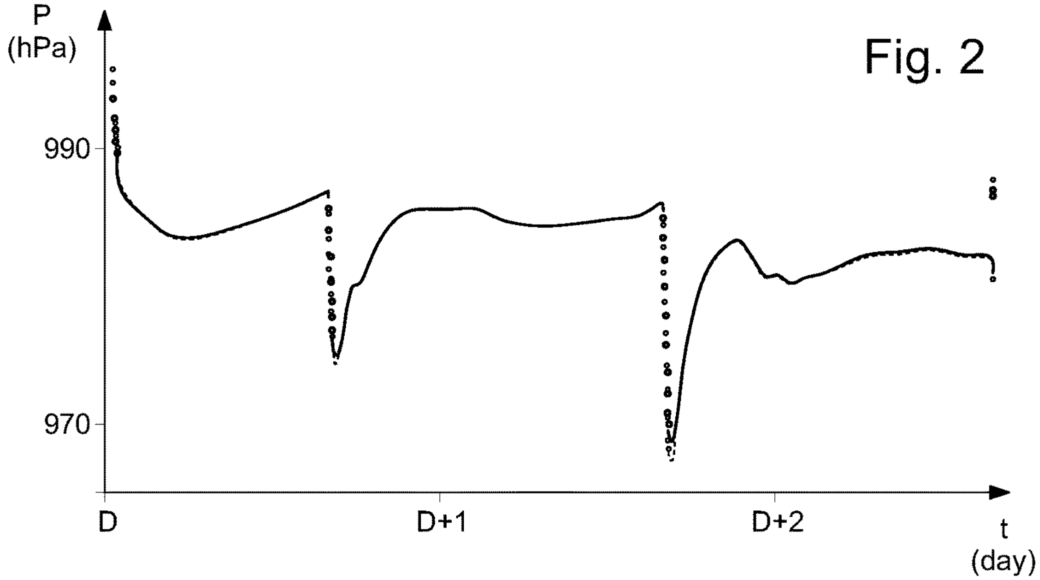
FIG. 2 superimposes, for the same horological movement, two graphs illustrating on the y-axis the pressure in hectopascal, as a function of the time on the x-axis, in days, one with a solid line calculated with the ideal gas law, the other measured.
Figure 3:
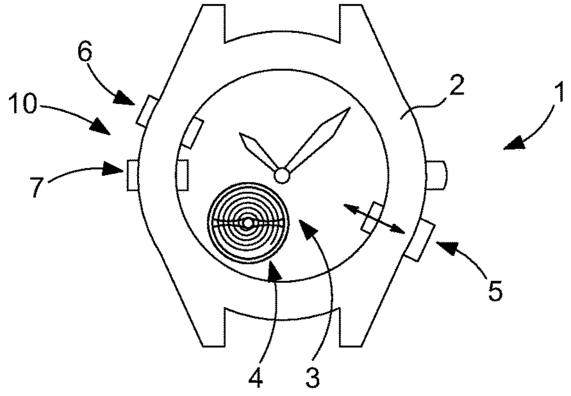
FIG. 3 represents, schematically, a watch in which the water-resistant case contains a movement itself including an oscillator, equipped with compensation means which include a water-resistant volumetric device for modifying the internal volume of the case, a water-resistant gas injection or extraction conduit, and a thermal device for the controlled and momentary increase of the internal temperature thereof.

The experiment shows us that these approximations are relatively correct. In FIG. 2, the pressure measured is compared to a theoretical pressure based on the ideal gas law: P=(n*R/V)*T. It is observed that the measurements and the theoretical approximation are relatively comparable. Furthermore, the experiment showed us that leaks are relatively low for a water-resistant watch even with a large pressure differential between the inside of the watch and the medium wherein it is located. We will therefore make the assumption that the watch is perfectly water-resistant.

The initial assumptions showed that the leaks from the watch are considered to be zero, the watch case cannot be distorted and the enclosed gas remains the same. It can therefore be concluded that the parameters n, R and V are constants; the pressure therefore varies linearly as a function of the pressure.

The invention proposes to essentially treat the compensation with regard to temperature and pressure variations. A combination of both effects is aimed at opposing them so that their effects cancel each other out (or are minimised). The main advantage for the user is better precision of the watch when worn.

The influence of humidity is less than those of temperature and pressure. In the working assumption, the humidity level changes little as a function of the temperature or the pressure, in the usual ranges of watch wearing. An approximated calculation consists of disregarding this variation.

The following assumptions are made to simplify the calculations:

- the pressure in the watch varies substantially linearly as a function of the temperature: P=[(n*R)/V]*T;
- the rate of the movement varies substantially linearly according to the thermal coefficient Ct of the oscillator, particularly of the spring balance: m(T)=Ct*T;
- the rate of the movement varies substantially linearly according to the gas pressure: m(P)=Cp*P.

The invention thus relates to a method for compensating the rate as a function of the temperature of a water-resistant watch 1, wherein the water-resistant case 2 contains a movement 3 itself including an oscillator 4. This case 2 contains, on leaving the factory after the initial rate setting, an internal volume V occupied by n moles of a gas of constant R substantially observing the ideal gas law. The constant R (or Avogadro's number) is known. It is dependent on the gas which is in the watch (in our case generally air). The number of moles n will depend on the watch closure conditions (atmospheric pressure, temperature or closure and locking of the back for example).

The volume available V is dependent on the case geometry. It is optionally possible to modify the design of the external parts to influence this point.

According to the invention, this pressure coefficient Cp of the movement 3 is determined in the factory by measurement and/or calculation, defining the relatively linear variation of the rate of the movement 3 as a function of the pressure P of the gas (or gas mixture where applicable). The pressure coefficient of the movement Cp can be measured experimentally or calculated theoretically. It is dependent on each movement.

Similarly, a value of the humidity coefficient Ch of the movement 3 is determined in the factory after measurement and/or calculation, defining the maximum relatively linear variation of the rate of the movement 3 as a function of the humidity H in the movement 3: m(H)=Ch*H. Failing a linear variation, the maximum slope value of the highest tangent to the rate/humidity graph is considered.

An optimal value Cto of the thermal coefficient Ct of the oscillator 4 is calculated, defining the relatively linear variation of the rate of the oscillator 4 as a function of the temperature T, this optimal value Cto being intended to compensate the pressure and humidity deviations according to the formula:

$$Cto=-[Cp*(n*R)/V]-[(Ch*H)/T].$$

Indeed, in order to enhance the precision of the watch (and not of the movement), we can establish the relation: m(T)+m(P)+m(H)=0, from which the value Cto above is obtained. Indeed, Cto is the optimal value, for which the sum of the rate deviations attributable to the pressure, temperature, and humidity, is zero; failing that, Cto is the value for which this total of the rate deviations has the lowest possible value.

$$Cto=-[Cp*(n*R)/V]-[Ch*H/T]$$

In the present example, it was considered that the thermal coefficient and the pressure coefficient are constant and vary the rate linearly as a function of the temperature. It is possible to construct a similar model if these parameters observe a non-linear law as a function of the temperature.

Given that the relative humidity will vary as a function of the temperature and that the rate of the watch will vary according to the humidity variations (via Ch), this theoretical model integrates the humidity parameter. However, this parameter can, in temperate regions, be disregarded as the influence of the humidity on the rate is substantially less than that of the temperature. In a simplified calculation, the humidity coefficient Ch of the movement 3 is determined at the value zero. In order to enhance the precision of the watch (and not of the movement), it is then possible to establish the simplified relation: m(T)+m(P)=0, from which the optimal value Cto of the thermal coefficient Ct of the oscillator 4 is calculated according to the formula: Cto=−[Cp*(n*R)/V], in accordance with the ideal gas law.

The method can be implemented differently, according to whether it consists of performing initial factory settings, or after-sales operations. In the case of after-sales, it is difficult or even impossible to have controlled-atmosphere chambers, but it is necessary to enable the after-sales technician to perform settings, with special tools that the end user could not have. The scope is greater in respect of factory settings, since it is possible to combine therein means for placing in a controlled atmosphere and controlled temperature, and also these means specifically designed for after-sales.

Thus, according to the invention:

- either for an after-sales application or when casing up in the factory, the watch 1 is equipped with compensation means 10 which are arranged to vary, inside said case 2, the pressure P and/or the nature of the gas and its constant R and/or the quantity of gas and its number of moles n and/or the temperature T,
- or for a preparation in the factory, the thermal coefficient of the elastic return means included in the oscillator 4 is modified by modifying an oxide layer thickness and/or applying a coating and/or by local ablation, and/or the number of moles of gas in the watch and/or the nature of the gas in the watch are modified, and/or the internal volume of the case 2 is modified.

More specifically, the pressure P and/or the number of moles n are modified by modifying the pressure P and/or by varying the temperature T of the watch 1 before closing the case 2.

The equation Ct=−[Cp*(n*R)/V] shows that the thermal coefficient Ct of the oscillator 4 is linked with the pressure coefficient Cp by the environment in the case 2 of the watch 1 (the gas present of constant R, the volume inside the watch V and the quantity of moles in the watch n). In order to render the watch insensitive (or reduce the sensitivity of the watch) to temperature, it is possible to work on the following parameters independently or in combination:

- the thermal coefficient Ct of the oscillator 4;
- the constant R linked with the nature of the gas, or gas mixture, present;
- the volume V available in the case 2 of the watch 1;
- the quantity n of gas present.

A first embodiment consists of working on the thermal coefficient of the oscillator 4. In the specific and non-restrictive case where this oscillator 4 is a spring balance, when producing a silicon and/or silicon oxide balance-spring, the thermal coefficient Ct of the sprung balance assembly can be adjusted particularly as a function of the thickness of the oxide layer which covers this balance-spring.

Let us consider that the rate variation of a movement as a function of the pressure varies as follows: Cp=−0.015 seconds per day per hectopascal. Considering external watch parts with a generic casing, we obtain experimentally that the constant (n*R)/V equals approximately 3.3 hPa/K. It was calculated on the basis of the measurements of the pressure and the temperature in the watch head in the ideal gas law.

So that the watch is least sensitive to temperature variations, it would be necessary to target a thermal coefficient of the oscillator at 0.05 seconds per day per Kelvin. This value is calculated on the basis of the equation Ct=−[Cp*(n*R)/V]: (0.015*3.3=0.05).

By targeting the thermal coefficient of the spring balance at a value different from 0 seconds per day per Kelvin, the chronometric measurements in movement will be disturbed. For example, when running a certification as a chronometer with phases at 8° C. and 38° C., there would be a rate difference of the order of 1.5 seconds per day generated by the thermal coefficient of the movement between the hot and cold phases. However, if this movement is cased in the watch from the preceding example (Cp=−0.015, (n*R)/V=3.3), the rate becomes practically insensitive to the temperature variation.

More specifically, the elastic return means of the oscillator 4 are made of silicon and/or silicon oxide, and, during the preparation in the factory, the thermal coefficient of these elastic return means is modified by modifying the silicon oxide layer thickness.

More specifically, the elastic return means of the oscillator 4 are made in the form of thin elastic strips with a “LIGA” method, and, during the preparation in the factory, the thermal coefficient of these elastic return means included in the oscillator 4 is modified by applying a coating and/or by local ablation.

More specifically, the elastic return means of the oscillator 4 are made in the form of thin elastic strips with a drawing or rolling method, and, during the preparation in the factory, the thermal coefficient of these elastic return means included in the oscillator 4 is modified by applying a coating and/or by local ablation.

A second embodiment consists of modifying the quantity of gas in the watch. Indeed, if the number of moles of gas is changed in the watch, Ct and Cp can be compensated. The link between the two preceding constants is expressed in the equation Ct=−[Cp*(n*R)/V]. For example, if Ct=0.055 seconds per day per Kelvin, Cp=−0.015 seconds per day per hectopascal and (n*R)/V=3.3 hectopascal per Kelvin, the number of air molecules in the watch should be multiplied by 1.1 (0.055/(0.015*3.3)=1.1).

In order to change the number of molecules in the watch, there are two solutions:

- close the watch in an environment with a defined pressure: if the atmospheric pressure is at 970 hPa, it should be at 1067 hPa (970*1.1) when casing up so that the rate of the watch is insensitive to temperature;
- or close the watch with a given watch temperature: if the temperature of the environment is 23° C. (~296 K), the watch should be heated to approximately 53° C. (~329 K=296*1.1).

The temperature and the pressure are linked together by the ideal gas law, therefore, it is necessary to ensure that the two parameters are monitored in order to prevent errors linked with atmospheric pressure variation, the altitude or temperature variation.

Modifying the pressure before casing up is relatively complex; particularly in after-sales when a store does not have the suitable equipment. Modifying the temperature of the watch before casing up seems to be relatively easy to implement; for example by placing the open watch on a heating or cooling plate. The main problem of this implementation is that Ct and Cp can only cancel each other out if they are of opposite signs. Moreover, if Ct has a 5% variation, this represents approximately 20° C. Therefore, it should be expected that the temperatures required to compensate Ct are potentially difficult to reach.

More specifically, during the preparation in the factory, the number of moles of gas in the watch 1 is modified, either by closing the case 2 with a pressure defined by calculation to render the rate of the watch insensitive to temperature, or by closing the case 2 with a temperature defined by calculation to render the rate of the watch insensitive to temperature, and by slow cooling of the case 2 after the closure thereof.

A third embodiment consists of modifying the composition of the gas in the watch. By modifying the composition of the gas in the watch 1, for example by closing the watch 1 in a saturated medium with another gas, the constant R of the equation Ct=−[Cp*(n*R)/V] would thus be modified. For example if Ct=0.02 seconds per day per Kelvin, Cp=−0.015 seconds per day per hectopascal and the constant (n*R)/V=3.3 hectopascal per Kelvin, the air (R=287 J/kg/K) in the watch could, for example, be replaced by sulphur dioxide (R=130 J/kg/K). In this case, the correction would be made to 90% (0.015*3.3*130/287=0.0224). As a general rule, by selecting the correct gas or gas mixture (modification of R and with no impact on the materials in contact), it is theoretically possible to minimise the effect of the temperature in the watch. It is assumed that the influence of modifying the gas on Cp is negligible. Furthermore, considering that Ct has a certain variability, this means a specific gas mixture would be needed for each watch. A further disadvantage lies in that each closure of the back should be performed in a controlled atmosphere. Finally, this solution is theoretically only realistic when Ct and Cp are of opposite signs.

More specifically, during the preparation in the factory, the nature of the gas contained in the watch is modified, by complete or partial exchange of the gas with a new gas or gas mixture having another value of said constant R, adapted for the suitable adjustment of the thermal coefficient Ct to render the rate of the watch insensitive to temperature.

More specifically, the case 2 is sealed after this gas exchange, to prevent any action of the user in the absence of a special tool.

A fourth embodiment consists of working on the geometry of the interior of the watch. Indeed, the equation Ct=−[Cp*(n*R)/V] can be expressed in the form V/(n*R) =−Cp/Ct. Let us consider that Cp=−0.015 seconds per day per hectopascal and Ct=0.04 seconds per day per Kelvin. For a given practical case, we have identified that (n*R)/V=3.3 hPa/K. In order to minimise the effects on the rate of the watch, the air volume in the watch should be corrected such that it is 1.24 (3.3*0.015/0.04) times greater than that currently available. As the value of Ct varies from one movement to another, this means that the external parts should be adapted to each movement. Furthermore, as the volumes are already well optimised, it appears to be difficult to apply this method without influencing the watch design. A solution consists of modifying the internal volume of the case with a travel imparted to a mobile organ such as a piston or similar.

Thus, in an alternative embodiment designed particularly for an after-sales application, the compensation means 10 include a water-resistant volumetric device 5 enabling an after-sales technician to modify the internal volume of the case 2, and/or at least one water-resistant gas injection or extraction conduit 6, and/or a thermal device 7 for the controlled and momentary increase of the internal temperature thereof.

More specifically, this volumetric device 5 includes one piston mobile in the case 2 and under the action of an external micrometric control screwable and lockable in position with a special tool not supplied to the user.

More specifically, during the preparation in the factory, the internal volume of the case 2 is modified by adjusting the travel of at least one piston, under the action of an external micrometric control screwable and lockable in position with a special tool not supplied to the user.

More specifically, this water-resistant gas injection or extraction conduit 6 is lockable in position with a special tool not supplied to the user.

More specifically, this thermal device 7 includes means for converting light energy and/or means for storing energy.

More specifically, during the preparation in the factory, the gas or gas mixture contained in the case 2 is dried, to reduce the humidity H.

More specifically, during the preparation in the factory, a desiccator is inserted into the case, to fix the residual humidity H therein.

Finally, it is also possible to combine several effects simultaneously (variation of Ct, Cp, casing conditions or volume in the watch) in order to achieve the desired aim.

Generally, it appears that the dispersion of Ct must be minimised in order to minimise the effect of temperature on a watch.

The invention further relates to a watch 1 suitable for the implementation of this method, particularly in after-sales service. This water-resistant watch 1 includes a water-resistant case 2, which contains a movement 3 itself including an oscillator 4. This watch 1 includes compensation means 10, each lockable in position with a special tool not supplied to the user, which include a water-resistant volumetric device 5 enabling an after-sales technician to modify the internal volume of the case 2, and/or at least one water-resistant gas injection or extraction conduit 6, and/or a thermal device 7 for the controlled and momentary increase of the internal temperature thereof.

The invention claimed is:

1. A method for compensating a rate of a movement (3) as a function of the temperature of a water-resistant watch (1), wherein a water-resistant case (2) of the water-resistant watch (1) contains the movement (3) including an oscillator (4), said case (2) containing, on leaving a factory after an initial rate setting, an internal volume V occupied by n moles of a gas of constant R substantially observing the ideal gas law, wherein a pressure coefficient Cp of said movement (3) is determined in the factory by measurement and/or calculation, defining a relatively linear variation of the rate of said movement (3) as a function of a pressure P of said gas, wherein a value of a humidity coefficient Ch of said movement (3) is determined in the factory after measurement and/or calculation, defining a maximum relatively linear variation of the rate of said movement (3) as a function of a humidity H in said movement (3), wherein an optimal value Cto of a thermal coefficient Ct of said oscillator (4) is calculated defining a relatively linear variation of the rate of said oscillation (4) as a function of a temperature T, said optimal value Cto being intended to compensate pressure and humidity deviations according to the formula:

$$Cto=-[Cp*(n*R)/V]-[(Ch*H)/T],$$

and wherein,

- either for an after-sales application or when casing up in the factory, said watch (1) is equipped with compensation means (10) arranged to vary, inside said case (2), the pressure P and/or a nature of the gas and a constant R and/or a quantity of gas and a number of moles n and/or the temperature T,
- or for a preparation in the factory, the thermal coefficient of an elastic return means included in said oscillator (4) is modified by modifying an oxide layer thickness and/or applying a coating and/or by local ablation, and/or the number of moles of gas in said watch and/or the nature of the gas in the watch are modified, and/or the internal volume of said case (2) is modified.

2. The method according to claim 1, wherein the pressure P and/or the number of moles n are modified by modifying the pressure P and/or by varying the temperature T of said watch (1) before closing said case (2).

3. The method according to claim 1, wherein the humidity coefficient Ch of said movement (3) is determined to the value zero, and wherein said optimal value Cto of the thermal coefficient Ct of said oscillator (4) is calculated according to the formula:

$$Cto=-[Cp*(n*R)/V].$$

4. The method according to claim 1, wherein, for an after-sales application, said compensation means (10) include a water-resistant volumetric device (5) enabling an after-sales technician to modify the internal volume of said case (2), and/or at least one gas injection or extraction conduit (6), and/or a thermal device (7) for a controlled and momentary increase of the internal temperature thereof.

5. The method according to claim 4, wherein said volumetric device (5) includes one piston mobile in said case (2) and under the action of an external micrometric control screwable and lockable in position with a special tool not supplied to the user.

6. The method according to claim 4, wherein said water-resistant gas injection or extraction conduit (6) is lockable in position with a special tool not supplied to the user.

7. The method according to claim 4, wherein said thermal device (7) includes means for converting light energy and/or means for storing energy.

8. The method according to claim 1, wherein the elastic return means of said oscillator (4) are made of silicon and/or silicon oxide, and wherein, during the preparation in the factory, the thermal coefficient of said elastic return means is modified by modifying a silicon oxide layer thickness.

9. The method according to claim 1, wherein said elastic return means of said oscillator (4) are made in the form of thin elastic strips with a "LIGA" method, and wherein, during the preparation in the factory, the thermal coefficient of said elastic return means included in said oscillator (4) is modified by applying a coating and/or by local ablation.

10. The method according to claim 1, wherein said elastic return means of the oscillator (4) are made in the form of thin elastic strips with a drawing or rolling method, and wherein, during the preparation in the factory, the thermal coefficient of said elastic return means included in said oscillator (4) is modified by applying a coating and/or by local ablation.

11. The method according to claim 1, wherein during the preparation in the factory, the number of moles of gas in said watch is modified, either by closing said case (2) with a pressure defined by calculation to render the rate of the watch insensitive to temperature, or by closing said case (2) with a temperature defined by calculation to render the rate of the watch insensitive to temperature, and by slow cooling of said case (2) after the closure thereof.

12. The method according to claim 1, wherein during the preparation in the factory, the nature of the gas contained in the watch is modified, by complete or partial exchange of said gas with a new gas or gas mixture having another value of said constant R, adapted for the suitable adjustment of said thermal coefficient Ct to render the rate of the watch insensitive to temperature.

13. The method according to claim 12, wherein said case (2) is sealed after said gas exchange, to prevent any action of the user in the absence of a special tool.

14. The method according to claim 1, wherein, during the preparation in the factory, the internal volume of said case (2) is modified by adjusting a travel of at least one piston, under the action of an external micrometric control screwable and lockable in position with a special tool not supplied to the user.

15. The method according to claim 1, wherein during the preparation in the factory, the gas or a gas mixture contained in said case (2) is dried, to reduce the humidity H.

16. The method according to claim 1, wherein during the preparation in the factory, a desiccator is inserted into said case, to fix a residual humidity H therein.

17. A water-resistant watch (1), wherein a water-resistant case (2) of the water-resistant watch (1) contains a movement (3) including an oscillator (4), wherein said watch (1) includes compensation means (10), lockable in position with a special tool not supplied to the user, which include a water-resistant volumetric device (5) enabling an after-sales technician to modify an internal volume of said case (2), and/or at least one water-resistant gas injection or extraction conduit (6), and/or a thermal device (7) for a controlled and momentary increase of an internal temperature thereof, and wherein a rate of a movement (3) is compensated as a function of a temperature of the water-resistant watch (1) according to the method of claim 1.

18. The water-resistant watch (1) according to claim 17, wherein the water-resistant watch (1) comprises both of the extraction conduit (6) and the thermal device (7) as components of the water-resistant watch (1) that are physically separated from each other about the water-resistant case (2).

* * * * *